July 2, 1940.  H. A. WINKELMANN ET AL  2,206,441
METHOD OF MAKING LAMINATED PRODUCTS
Filed Dec. 21, 1935

Vulcanized Rubber Hydrochloride

Rubber

Inventors:
Herbert A. Winkelmann,
Eugene W. Moffett.
By Zabel, Carlson, Fitzhugh & Wells
Attorneys Patented July 2, 1940

2,206,441

UNITED STATES PATENT OFFICE 2,206,441

METHOD OF MAKING LAMINATED PRODUCTS

Herbert A. Winkelmann and Eugene W. Moffett, Chicago, Ill., assignors to Marbon Corporation, a corporation of Delaware Application December 21, 1935, Serial No. 55,685

4 Claims. (Cl. 154—2)

This invention relates to laminated products. More particularly it relates to a composite sheet of a rubber or rubber like material integrally united to a halogen containing rubber derivative. The preferred embodiment comprises a sheet of vulcanized rubber integrally united to a sheet of a vulcanized rubber hydrohalide.

This application is a continuation in part of my co-pending application Serial No. 22,431 filed May 20, 1935, which matured into Patent No. No. 2,075,254, dated March 30, 1937.

Sheets of halogen containing rubber derivatives such as sheets of rubber hydrohalides may be integrally united to rubber or rubber-like materials by superimposing the sheet of halogen containing rubber derivative on the rubber or rubber like materials and subjecting the assembly to heat and pressure.

The bonding of rubber hydrochloride to rubber and particularly to reclaim gives a laminated product of great utility, since such a product is cheap, and strongly resistant to ozone, oils, acids and alkalis due to the protective effect of the rubber hydrochloride. Thus it may be used for example as a lining for receptacles, as a covering for floors, roofs, etc., in hose, belting and flexible tubing, and as a protective outer facing for rubber boots.

We have further discovered that the union of rubber hydrochloride to rubber can be greatly strengthened by incorporating sulfur in the rubber hydrochloride and subjecting a composite layer of rubber and the sulfur containing rubber hydrochloride composition to heat and pressure sufficient to vulcanize the rubber hydrochloride. A temperature of about 290° F. and cure of 20 minutes is ordinarily satisfactory for most rubber hydrochloride and rubber stocks. At this time and temperature the rubber and rubber hydrochloride are both vulcanized interchangeably into a strong integral union. The rubber hydrochloride also changes into a softer, more flexible material so that the composite product is soft and flexible.

Figure 1:
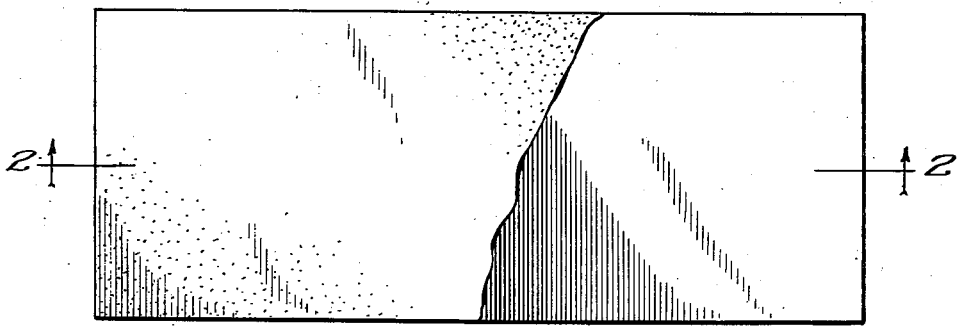
Fig. 1 is a plan view of the composite product of this invention, comprising rubber and vulcanized rubber hydrochloride.
Figure 2:
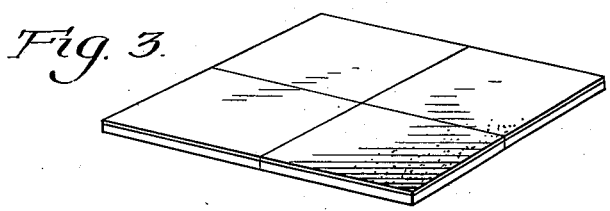
Fig. 2 is a sectional elevation, taken along line 2—2 of Fig. 1.
Figure 3:
Fig. 3 is a perspective view of a floor tile made of the composite product of rubber and vulcanized rubber hydrochloride.
Figure 4:
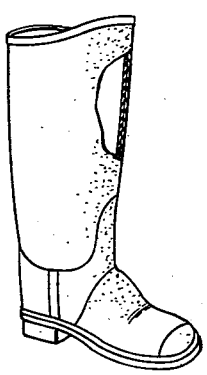
Fig. 4 is a perspective view of a boot made of the composite product of rubber and vulcanized rubber hydrochloride.
Figure 5:
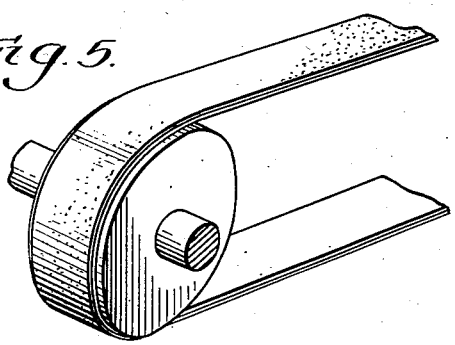
Fig. 5 is a perspective view of a belt made of the composite product of rubber and vulcanized rubber hydrochloride.

The following table gives an example of a preferred formula and a range for an operable formula:

Table I

| | Preferred | Variations |
|---|---|---|
| Rubber hydrochloride (30% chlorine content) | 100 | 100 |
| Vulcanizing agent: Sulfur | 7 | 0–100 |
| Accelerator: Butyraldehyde-aniline | 5 | 0–10 |
| Plasticizer: Cumar | 5 | 0–50 |
| Heat Stabilizer: | | |
| Magnesium oxide (MgO) | 10 | 0–100 |
| Lead oxide (PbO) | 10 | 0–100 |

Hard or soft rubber may be used. Pure gum stock and reclaims give good results. In general, any vulcanizable rubber or rubber like material can be used. However, a reclaim or a mixture of rubber and reclaim is the preferred base.

Other vulcanizing agents than sulfur may be used, as for example, selenium, tellurium. The use of sulfur chloride applied to the rubber hydrochloride immediately before assembling the rubber and rubber hydrochloride together results in a cold vulcanization of the rubber hydrohalide, and to some extent of the adjoining rubber.

Other accelerators for the vulcanization of rubber hydrochloride than butyraldehyde-aniline may be used. Piperidinium penta methylene dithio-carbamate gives good results. The use of an accelerator is not absolutely essential.

The use of heat stabilizers such as magnesium oxide, magnesium carbonate and lead oxide is useful in the heat treatment and when the mixture is made by milling.

Fillers such as blanc fixe, wood flour, etc., may be used in the rubber hydrohalide and/or the rubber.

The sulfur and other materials may be mixed with the rubber hydrochloride in any manner, for example by stirring into a solution of rubber hydrochloride in benzol or other volatile solvent. A cast sheet may then be made by evaporating the solvent. It is preferred, however, in the case of the rubber hydrohalide to mill the sulfur and other materials into the rubber hydrohalide in the absence of substantial amounts of solvents and calender the homogeneous mixture into a sheet.

The sheet of rubber hydrohalide or rubber halide composition is superimposed on a vulcanizable composition such as rubber or polymerized chloroprene or the like. The vulcanizable composition should preferably contain sulfur and accelerator although it has been found that a certain amount of vulcanization of the rubber may take place by migration of the sulfur of the rubber hydrochloride into the rubber. The composite sheet is vulcanized under heat and pressure in a heated mold or in a vulcanizer containing steam or hot water under pressure or dry heat under pressure. The temperature and time of cure may vary within wide limits, and is necessarily more for some types of stock than others. A temperature of 290° F. and a time of twenty minutes has been found satisfactory for the compositions of Table I using a pure gum stock and rubber hydrochloride. At this temperature and time, for example, the rubber and rubber hydrohalide both become cured or vulcanized, and both become relatively non-thermoplastic. The vulcanization of the rubber hydrohalide improves its adhesive properties, particularly at elevated temperatures. Thus it becomes possible to remove the composite vulcanized product from a hot mold with consequent saving of time and expense. The vulcanized rubber hydrochloride is also more resistant to oils, solvents and ozone than a vulcanized rubber. Thus it becomes possible to use rubber goods protected with vulcanized rubber hydrohalides where they are exposed to ozone and corona, as for example in ozone generators, condensers and electrical insulation such as insulation for ignition wires.

The rubber hydrochloride adhered to rubber by the process described above is bonded so that it cannot be torn loose. The proportion in the formula of Table I, the time and temperature of cure must, however, be modified to obtain this result with all types of rubber stock. Reclaim and rubber of low plasticity gives the preferred results. However, pure gum stock and tread stock is operable.

Although the invention has been described as carried out with an unvulcanized rubber, it may be carried out with advantages with prevulcanized rubber. A composite product of rubber hydrohalide containing sulfur and accelerator, and vulcanized rubber can be bonded together by vulcanization. The composite structure may also be bonded together by pressure. It is advisable, however, to subject the structure to heat sufficient to at least thermoplasticize the rubber hydrohalide, and preferably sufficient to cure or vulcanize the rubber hydrohalide.

The use of rubber hydrobromide in place of rubber hydrochloride is within the bounds of this invention. Halogenated rubber hydrohalides, and rubber halides may be used to some extent but in many important respects they act entirely differently than the hydrohalides, as for example, in their action toward sulfur and vulcanizing agents, and their instability particularly under the influence of heat, and in their greater solubility and lesser oil resistance. It has been found that the rubber hydrohalides have such properties that they of themselves and in conjunction with other materials give a superior bond to rubber and one having greater utility than the rubber halide—rubber bond.

By way of example, oil resistant rubber boots may be made in accordance with the principles of this invention. Crystalline type rubber hydrochloride and preferably the extremely insoluble and oil resistant type of rubber hydrochloride made by reacting rubber with hydrogen chloride gas at temperatures of 90° C. to 110° C. as described and claimed in the copending application, Serial No. 82,158, is milled and calendered into a homogeneous sheet of viz. $\frac{1}{16}$" thickness or less. Preferably sulfur and an accelerator are milled into this sheet. The rubber hydrochloride sheet is shaped over a rubber boot of vulcanizable rubber and the two materials molded by heat and pressure for a time and temperature sufficient to vulcanize the rubber and the sulfur containing rubber hydrochloride into an integral rubber boot. Similarly hose, flooring, belting, receptacles and the like may be made from integrally bonded rubber and rubber hydrochloride.

A cheap rubber base such as is made from reclaim or mixtures of rubber and reclaim may be vulcanized to a sheet of rubber hydrochloride containing pigments or dyes thus producing a colored laminated product which is cheap and of great utility. Flooring in particular may be made from a reclaim base vulcanizably united with a layer of rubber hydrochloride. Such a laminated product is resilient, strong, and oil resistant, being superior to an ordinary rubber flooring composition in many ways. With rubber hydrochlorides thick sheets of even ½ inch or more thickness may be made by milling and calendering in the presence of magnesium oxide or other heat stabilizer. Such thick sheets may be laminated to a thicker or thinner sheet of rubber, and are particularly desirable where the rubber hydrochloride layer is to be subjected to wear as in the case of flooring. For floors the rubber hydrochloride layer is preferably of thickness greater than film thickness. Although rubber halides may be likewise used they are not preferred and are a less satisfactory material, particularly where resistance to lubricating oils, gasoline, benzol and the like is desired, or where the material must stand temperatures even slightly beyond room temperature. Furthermore it is extremely difficult to obtain rubber chloride sheets of viz. $\frac{1}{16}$" or more such as are required for many purposes. The preferred halogen containing rubber derivative is a substantially saturated rubber hydrochloride made by reacting solid rubber with hydrogen chloride at above −35° C., and preferably at substantially above room temperature. This material is herein designated as substantially saturated insoluble type crystalline rubber hydrochloride. For many purposes where oil resistance is not of prime importance, amorphous rubber hydrochloride and unsaturated rubber hydrohalides are satisfactory, particularly when vulcanized.

The term "vulcanized, relatively non-thermoplastic rubber hydrochloride" means that the rubber hydrochloride has been converted by reaction with sulfur or equivalent material to a state in which it is removable from a hot mold.

Although the invention has been described as above with relation to the use of rubber, it is not intended to so limit it except as necessitated by the prior art. The process is operable to unite rubber and vulcanizable rubber like materials such as polymerized chloroprene, polymethylene—polysulphide plastics, to halogen containing rubber derivatives such as rubber hydrochloride.

While there has been disclosed with considerable detail certain preferred manners of performing this invention, it is not intended or desired to be solely limited thereto, for as hitherto stated the procedure may be modified, the precise proportions of the materials utilized may be varied, and other materials having equivalent properties may be employed if desired without departing from the spirit and scope of the invention as defined in the appended claims.

We claim:

1. The method of making a laminated product which comprises superimposing a layer of curable rubber composition upon a layer of curable rubber hydrohalide composition containing sulfur and accelerator and subjecting the two layers to heat in pressure contact for a sufficient time and at such temperature as to convert the rubber hydrohalide to a state in which it is removable from a hot mold.

2. The method of making a laminated product which comprises superimposing a layer of curable rubber composition containing sulfur upon a layer of curable rubber hydrochloride composition containing sulfur and accelerator, and vulcanizing the two in pressure contact for a sufficient time and at such temperature as to convert the rubber hydrochloride composition and rubber composition to a relatively non-thermoplastic state such that the product is removable from a hot mold.

3. The method of making a laminated product which comprises superimposing a layer of curable rubber composition containing sulfur upon a layer of curable rubber hydrochloride composition containing sulfur, an accelerator, and a basic stabilizer for said rubber hydrochloride and vulcanizing the two in pressure contact for a sufficient time and at such temperature as to convert the rubber hydrochloride composition and rubber composition to a relatively non-thermoplastic state such that the product is removable from a hot mold.

4. The method of making a laminated product which comprises superimposing a layer of curable rubber composition containing sulfur upon a layer of rubber hydrochloride composition containing sulfur, an accelerator, magnesium oxide and lead oxide, and vulcanizing said composition in pressure contact for a sufficient time and at such temperature as to convert the rubber hydrochloride composition and rubber composition to a relatively non-thermoplastic state such that the product is removable from a hot mold.

HERBERT A. WINKELMANN.
EUGENE W. MOFFETT.